March 29, 1966        J. L. McGANN        3,242,978
ELECTRIC CONTROL APPARATUS FOR A PLURALITY
OF TEMPERATURE-AFFECTING UNITS
Filed Nov. 13, 1962
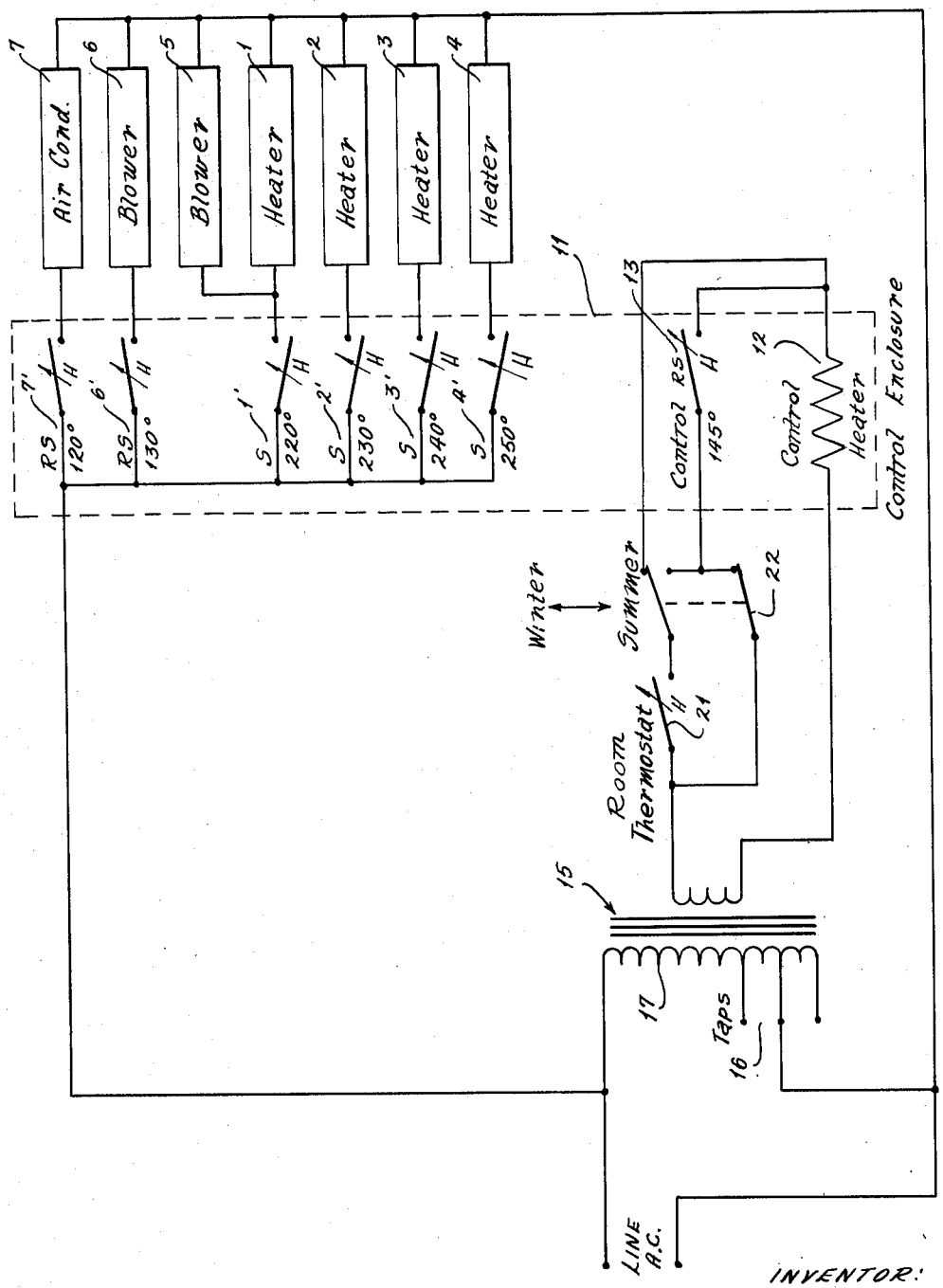
INVENTOR:
JOHN L. McGANN
BY
Jerome A. Grose,
ATTORNEY.

3,242,978
ELECTRIC CONTROL APPARATUS FOR A PLU-
RALITY OF TEMPERATURE-AFFECTING UNITS
John L. McGann, Affton, Mo., assignor to International
Oil Burner Company, St. Louis, Mo., a corporation of
Missouri
Filed Nov. 13, 1962, Ser. No. 237,252
6 Claims. (Cl. 165—25)

This invention relates to electric staging control apparatus, wherein a plurality of temperature-affecting units, such as separate heaters in a heating apparatus, are progressively actuated in a staged, time-delay sequence.

It is usually undesirable to actuate a multi-unit electrical heating or cooling apparatus to full capacity at a single instant. Reasons for this range from the relatively minor consideration that lights may dim suddenly on a sudden increased power use, to more significant engineering considerations, such as that the demand for heating and cooling may not always require the full capacity of the apparatus.

In apparatus of modest proportions, such as small electrically heated furnaces, it is important that the cost of staged operation be kept at a minimum. This consideration alone may preclude the use of usual time-delay circuit elements. Such elements would not however provide staged operation as a function of the demand on the heating or cooling apparatus during varying conditions of operation.

In general the present invention effects thermostatic control over systems having more than one primary heating or cooling unit by thermoswitches connected to each primary unit and located within a control environment containing a control heater. These primary unit thermoswitches open and close in a sense contrary to the demands for heating or cooling. Specifically as applied to a heating system, when the control heater is connected in circuit by a room thermostat located out of such control environment, the progressive temperature rise within the control environment turns on the primary heating unit thermoswitches progressively. When the demand for heat is satisfied and the room thermostat switches the control heater out of circuit, thus discontinuing the heating of the control environment, its progressive cooling by the surrounding space shuts off the primary heater units progressively. A control limit thermoswitch, added in the room thermostat circuit, holds the control temperature within the control environment close to the operating range of the primary unit thermoswitches.

As applied to a cooling system having more than one primary cooling unit, the system operates as follows. When the temperature of the cooled space rises to a selected temperature, the thermostat shuts off the control heater. The thermoswitches of the separate cooling units are then progressively closed by the drop of temperature within the control environment of the control heater; and the cooling units are thus put in operation in a staged, time-delay sequence.

If the voltage supplied to the control heater drops only slightly, its heat output will be substantially less than design value. In perfecting this invention, it has been found that with careful control over the voltage supplied to such control heater, its heat output will be so reliable as to make predictable the time intervals at which the staged unit thermoswitches will operate. Further, it becomes feasible to use the same control heater and its limit thermoswitches for both a heating system and a cooling system. In the embodiment shown in the drawings, the heater and its limit thermoswitches are put in parallel circuit with the room thermostat to serve as a low limit temperature control for the heating unit switches, which operate in a higher range. Alternately, they are switched into a series circuit with the same thermostat to serve as a high limit temperature control for cooling system switches, which operate at lower temperatures.

The drawing shows a wiring diagram of an embodiment of the present invention, in which a control enclosure which de-limits the control environment is shown schematically by dashed lines. The embodiment so shown includes both heating and cooling elements to be operated thermostatically in staged sequence. They are heater units 1, 2, 3, 4, a blower 5 shown connected in parallel with the heater 1 first to be operated; blower 6 and an air conditioner unit 7. By connections not shown but which will be apparent the same blower 5 might be employed in place of the blower 6.

The heating units are connected to and disconnected from the primary circuit by individual thermoswitches, each set to operate at a different temperature. For convenient reference, each such thermoswitch is designated with an "S" and numbered to correspond with the number of the heating or cooling unit which it serves, with an added prime superscript ('). Thus heater units 1, 2, 3 and 4 are served by thermoswitches S1', S2', S3', S4' respectively.

Thermoswitches of the type which open on a rise are designated with the letters "RS." Thus the air conditioner blower 6 and the air conditioner unit 7 are served by switches RS6' and RS7' respectively. The thermoswitches above mentioned are referred to hereinafter from time to time as "primary unit thermoswitches."

A series of typical operating temperatures selected for these switches, and at which they will operate on temperature rise, is marked in the drawing adjacent to each; thus the heater unit switch S1' will close at 220°, and the air conditioner switch RS7' will open at 120°. The set of operating temperatures shown in the drawing is merely representative of a series in which staged operation and the other purposes of the invention are secured.

The primary unit thermoswitches are mounted in a control enclosure designated 11 by the dashed line shown in the drawing. This may be a simple box, preferably not ventilated, in which they are mounted. The control enclosure 11 as marked on the drawing is significant principally in its defining of a control environment in proximity to a control heater 12. Using a simple low voltage control heater 12, the exclusion of convection currents of air is an important function of the control enclosure 11. However, with a different type of heater, such as one which spreads its heat by radiation or conduction to thermoswitches, the control environment might be effectively delimited by means other than the control enclosure 11; and all such means are to be considered as equivalents.

Rise and fall of the temperature within the control environment, is a function of energizing and de-energizing the heater 12. If energized for a sufficiently long period of time it will cause all the heater unit switches S1', S2', S3', S4' to close progressively, thus connecting their respective heater units 1, 2, 3, and 4 in the circuit successively in a time-delay sequence. Similarly, for summer use, should the heater 12 be de-energized from circuit so long as to permit the temperature of the control environment to drop below the operating limit set by the ambient limit thermoswitch 13, the blower and air conditioner unit switches RS6', RS7' would be successively operated in a staged, time-delay sequence.

To limit the departure of the control temperature within the control environment, so as to avoid undesirably long delay in initiating operation of the sets of switches, I provide within such control environment also a control limit thermoswitch designated in the drawing as RS–13, which may be set to open on reaching a temperature of say 145°, a temperature well below the operating temperatures of the heater unit switches S1′, S2′, S3′, S4′ and yet well above the operating temperatures of air conditioner unit switches RS6′ and RS7′. It serves as a limit thermoswitch for the control environment, setting a low temperature limit for winter operation of the heater units 1, 2, 3, 4, and setting a high temperature limit in the control environment for summer operation of the air conditioning system units 6 and 7.

This being the intended manner of functioning, the secondary circuit will be explained. A transformer 15 of the type having several taps 16 in its primary winding 17 is connected in parallel with the line voltage. Fairly precise fixing of the secondary or output voltage is required for successful operation of the heater 12. For example, if the line voltage were 208 v. instead of 230 v. for which equipment might be designed, the secondary circuit voltage of the transformer 15 would be proportionately lessened but the effective heat output of the heater 12 would be disproportionately lessened. I have found that sufficiently precise control is obtained by providing the primary transformer winding 17 with one or more taps 16 for connection into the primary circuit. By such tap connection the output voltage of the sceondary winding may be fixed at a precise figure, say 24 v.

The heater 12 receives the secondary current through a circuit including the thermoswitch 13, a manual winter-summer switch (shown as the double throw gang switch 22), and a room thermostat 21 (not within the control environment and set for example at 72°), like the theroswitch 13 opening on rise in temperature. The winter-summer (or "season") switch 22 may be set for winter operation in the sense corresponding to the upward direction shown in the drawing; the thermostat 21 and control thermoswitch 13 are then engaged in parallel, and the control thermoswitch 13 serves as a low limit control of the temperature within the control environment. For summer operation the gang switch 22 is thrown in the opposite sense, so as to connect the room thermostate 21 and the control thermoswitch 13 in series; and it then serves as a high limit control of the temperature within the control environment.

The primary unit thermoswitches S1′, S2′, S3′, S4′, and RS6′, RS7′ within the control environment each operate in a sense opposite to what would be its seemingly "normal" sense of operation. Thus, the heater unit thermoswitches S1′, S2′, S3′, S4′ close as the temperature rises; and the air conditioner unit switches RS6′, RS7′ close as the temperature drops. This operation in a sense opposite to "normal" follows from the fact that they are in the control environment which is heated well above room temperature by a circuit including the room thermostat 21, and that it in turn responds to the effects of actuating and deactuating the heating or cooling units which said thermoswitches control.

The thermoswitches employed are inexpensive and highly reliable. No conventional time-delay circuitry is needed. A single heater 12 and thermostat 21 and control thermoswitch 13 serve the unit for both summer and winter operation.

It will be understood that the circuitry shown is quite simple, and that other circuit elements having substantially the same functions may be substituted. For example, for each of the heater units switches S1′, S2′, S3′, S4′ might be substituted a relay operated switch, with appropriate circuitry which will be familiar, While I show each thermoswitch as having a different operating temperature setting, different physical positionings from the heater 12 (such as above or below, or at different distances) will serve to effect time-delayed or staged operation much in the same way as different temperature settings; and these are to be considered as equivalents. Other obvious modifications may be employed, such as more complex procedures for establishing the secondary voltage at a fixed value. Accordingly the present invention should not be construed narrowly, but rather as fully coextensive with the claims hereof.

I claim:
1. The combination of
   an electrical heating unit,
   an electrical cooling unit, and
   an electrical control system comprising
   a thermostat responsive to changes in room temperature including the effect thereon of the actuation and deactuation of said heating and cooling units,
   an electrical control heater,
   means to delimit a control environment about the control heater,
   thermoswitches within ithe control environment heated by the heater, each connected in circuit with one of said heating or cooling units,
   said thermoswitches being set to operate at different temperatures,
   a limit thermoswitch within the control environment heated by the heater and
   set at a temperature intermediate between the settings of the thermoswitches connected to said heating and cooling units, and
   switch and connector means
   switchable in one sense to connect said limit thermoswitch in series circuit with the thermostat
   whereby to establish a high temperature limit in said control environment,
   said switch and connector means being switchable in another sense to connect said limit thermoswitch in parallel circuit with the thermostat
   whereby to establish a low temperature limit in said control environment.

2. A staged system for controlling the supply of electrical power to apparatus of the type having a plurality of primary temperature-affecting units, comprising
   a room thermostat,
   an electrical control heater,
   means to connect said thermostat and control heater to a source of electricity,
   enclosure means delimiting a control environment in which said control heater is located, whereby the heater supplies a control temperature thereto,
   the thermostat being located out of said enclosure means,
   a plurality of thermoswitches located in the control environment, each connectable in series with a source of electricity and one of such primary temperature-affecting units, said thermoswitches being operable sequentially in response to changes in the control temperature,
   a control limit thermoswitch within the control environment, and
   means to so connect the limit thermoswitch in circuit with the thermostat and control heater as to limit the extent of departure of the control temperature from the range of changes of control temperature in which said plurality of thermoswitches so operate sequentially.

3. A staged control system as defined in claim 2, wherein the control limit thermoswitch so connected to the control heater is actuable at a temperature below the range of temperatures of actuation of said thermoswitches, said last recited means connecting said limit thermoswitch in parallel circuit with the thermostat.

4. A staged control system as defined in claim 2, wherein the limit thermoswitch being actuated at a higher temperature than the range of temperatures of actuation of the thermoswitches, said last recited means connecting said control limit thermoswitch to the thermostat in a series circuit.

5. A staged system for controlling apparatus of the type having a plurality of temperature-affecting units powered from a single source of electricity, comprising
- a room thermostat,
- an electrical control heater,
- means to operatively connect said thermostat and control heater to a source of electricity whereby a control temperature is generated in proximity to the control heater,
- the thermostat being located remotely from said control heater,
- a plurality of thermoswitches located in heat receiving proximity to said control heater, each being connectable to one of such temperature-affecting units, the said thermoswitches being operable sequentially in response to changes in the control temperature,
- a limit thermoswitch located in heat receiving proximity to said control heater,
- said limit thermoswitch being of the type which closes on temperature drop, and
- means so to connect the limit thermoswitches in circuit with the thermostat and control heater as to limit the extent of departure of the control temperature from the range of changes of control temperature in which said plurality of temperature-affecting unit thermoswitches so operate sequentially.

6. An electrical staging control and system of temperature-affecting apparatus, comprising
- a plurality of temperature-affecting units,
- an electrical control heater,
- a plurality of thermoswitches located in heat receiving proximity to the control heater, each connected in circuit with a temperature-affecting unit,
- the thermoswitches being set at a range of temperature settings so as to operate in staged progression in response to the heating and cooling of said control heater,
- a thermostat responsive to changes in room temperature including the effects of actuation and deactuation of the temperature-affecting units,
- together with a first electric circuit including means to connect the temperature-affecting units and their respective thermoswitches to a source of electrical power whereby to deliver power to such temperature-affecting units, and
- a second circuit including means to connect the thermostat to the control heater and to such electrical power source,
- together with
- a limit thermoswitch located in heat receiving proximity to said control heater and
- means to so connect said limit thermoswitch in the said second circuit as to limit the extent of departure of control temperature from the range of settings of said thermoswitches,
- whereby to control the time-delay between the actuation of the thermostat and the response of the thermoswitches thereto.

References Cited by the Examiner
UNITED STATES PATENTS

| | | | |
|---|---|---|---|
| 2,068,283 | 1/1937 | Stuart | 165—25 |
| 2,188,877 | 1/1940 | Kriechbaum | 165—25 |
| 2,993,106 | 7/1961 | Maudlin et al. | |
| 3,046,380 | 7/1962 | Carlson | 236—68 |
| 3,052,788 | 9/1962 | Peters. | |

JAMES W. WESTHAVER, *Primary Examiner.*

K. W. SPRAGUE, *Assistant Examiner.*